(12) United States Patent
Veiseh

(10) Patent No.: US 11,345,109 B2
(45) Date of Patent: May 31, 2022

(54) METHOD FOR PRODUCING A RECYCLABLE BAG

(71) Applicant: SIMPLE CONTAINER SOLUTIONS, INC., Rancho Dominguez, CA (US)

(72) Inventor: Charles S. Veiseh, Los Angeles, CA (US)

(73) Assignee: SIMPLE CONTAINER SOLUTIONS, INC., Rancho Dominguez, CA (US)

( * ) Notice: Subject to any disclaimer, the term of this patent is extended or adjusted under 35 U.S.C. 154(b) by 32 days.

(21) Appl. No.: 17/146,642

(22) Filed: Jan. 12, 2021

(65) Prior Publication Data
US 2021/0221087 A1    Jul. 22, 2021

Related U.S. Application Data

(60) Provisional application No. 62/962,453, filed on Jan. 17, 2020.

(51) Int. Cl.
*B31B 70/68* (2017.01)
*B31B 70/16* (2017.01)
(Continued)

(52) U.S. Cl.
CPC .............. *B31B 70/68* (2017.08); *B31B 70/10* (2017.08); *B31B 70/16* (2017.08); *B31B 70/26* (2017.08);
(Continued)

(58) Field of Classification Search
CPC ......... B31B 70/68; B31B 70/26; B31B 70/76; B31B 2155/002; B31B 2160/10;
(Continued)

(56) References Cited

U.S. PATENT DOCUMENTS 4,450,028 A * 5/1984 Vilutis .................. B32B 37/153
493/193
4,726,169 A * 2/1988 Achelpohl .............. B31B 70/00
53/553
(Continued)

FOREIGN PATENT DOCUMENTS

GB          2297288 A  *  7/1996  .............. B31B 35/86

*Primary Examiner* — Andrew M Tecco
*Assistant Examiner* — Jacob A Smith
(74) *Attorney, Agent, or Firm* — Dilworth IP, LLC

(57) ABSTRACT

A process for producing bags comprising:
  feeding a bottom web, a first side web and a second side web in a conversion process, each of the webs having a first side edge and a second side edge, wherein the first side edge of the first side web is aligned with the first side edge of the second side web, the second side edge of the first side web is aligned with the first side edge of the bottom web, and the second side edge of the second side web is aligned with the second side edge of the bottom web, thereby forming an inverted T-shaped web comprising a base having first and second wing portions and a riser, wherein the first wing portion comprises the bottom web and first side web, the second wing portion comprises the bottom web and the second side web, and the riser comprises the first and second side webs;
  sewing the first side web to the bottom layer in the first wing portion with a repeating pattern comprising a truncated triangle having a narrow portion and wider portion, and a tab separating the triangles, wherein the narrow portion of the triangle points toward the second side edge of the first side web;
  sewing the second side web to the bottom layer in the second wing portion with a repeating pattern comprising a truncated triangle having a narrow portion and
(Continued)

wider portion, and a tab separating the triangles, wherein the narrow portion of the triangle points toward the second side edge of the second side web;

contacting the first and second wing portions by folding them toward each other, thereby forming a folded web;

rotating the folded web to the horizontal;

sewing the first and second webs together in the riser with a repeating pattern comprising a flat-bottomed U shape with tabs separating the repeating U's, where the flat bottom of the U faces the first side edge of the first and second side webs, and the tabs separating the flat-bottomed U's are bisecting the tab separating the triangles in the first and second wing portions, thereby forming a web of sewn bags;

cutting the web along the edge of sewn bags to remove the sewn portion corresponding to the flat bottom portion of the flat bottom U shape parallel to the edge, thereby forming a web of open top bags; and transversely cutting the web of open top bags at the middle of the truncated triangles and bisecting the repeating U's, thereby forming separate, open bags, and optionally scrap material.

8 Claims, 16 Drawing Sheets

(51) Int. Cl.
*B31B 70/10* (2017.01)
*B31B 70/26* (2017.01)
*B31B 155/00* (2017.01)
*B31B 150/00* (2017.01)

(52) U.S. Cl.
CPC ... *B31B 2150/001* (2017.08); *B31B 2155/002* (2017.08)

(58) Field of Classification Search
CPC . B31B 2160/20; B31B 2155/00; B31B 70/00; B65D 29/00; B65D 88/18
USPC ....... 493/214, 189, 210, 212, 221, 227, 264, 493/267
See application file for complete search history.

(56) References Cited

U.S. PATENT DOCUMENTS

| | | | | |
|---|---|---|---|---|
| 5,117,610 | A * | 6/1992 | Hartman | B41F 17/02 53/553 |
| 8,317,671 | B1 * | 11/2012 | Zoeckler | B65D 5/48024 493/379 |
| 2016/0296211 | A1 * | 10/2016 | Luffman | B65B 9/10 |

* cited by examiner

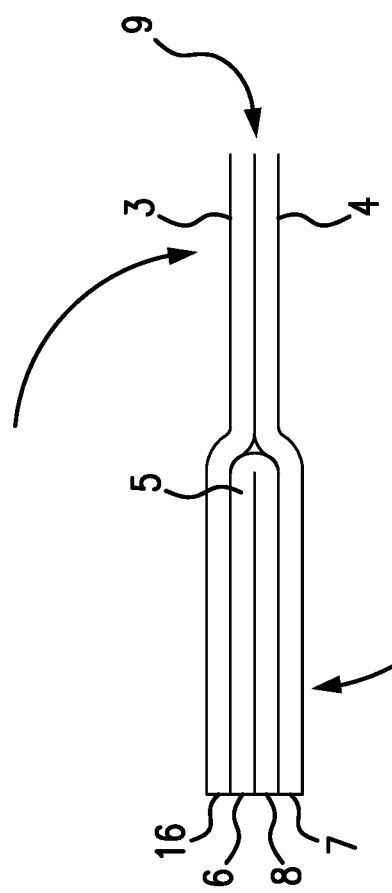
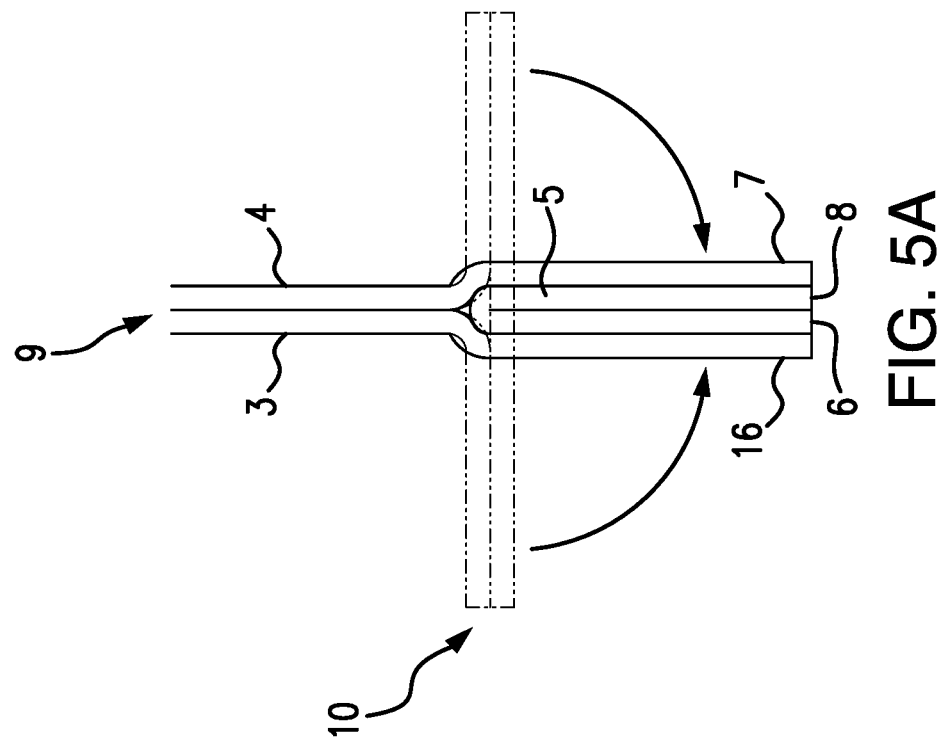
FIG. 5B
FIG. 5A

METHOD FOR PRODUCING A RECYCLABLE BAG

FIELD OF THE INVENTION

The present invention relates to a process for producing bags. In particular, the present invention relates to a process for producing a recyclable bag from cellulosic material.

BACKGROUND

The advance of green technology has placed a premium on sustainability in all facets of our lives. Increasingly, recyclable materials, displace conventional non-recyclable materials as the market demands and product innovation allows. For example, work has been ongoing to utilize cellulosic materials to manufacture shipping liners that can also be used as a carrying bag. Various methods are used to manufacture such liners/bags with an expandable or square bottom that increases storage volume and facilitates a fit inside a square carton. Nevertheless, improved systems for efficiently producing such bags, particularly recyclable bags from recyclable material having good insulating properties, is needed. It has unexpectedly been discovered that an inventive manufacturing method for producing a bag can efficiently manufacture a recyclable square bottom bag with excellent insulating properties.

BRIEF DESCRIPTION OF THE DRAWINGS

The subject matter of the present disclosure will be more fully understood from the following detailed description, taken in connection with the accompanying drawings, in which:

FIG. 5A is an edge-on view of the inverted T web, where the wing portions are each folded inward.

FIG. 5B shows the folded web of FIG. 5A which has been rotated clockwise to the horizontal.

SUMMARY OF THE INVENTION

Figure 1:
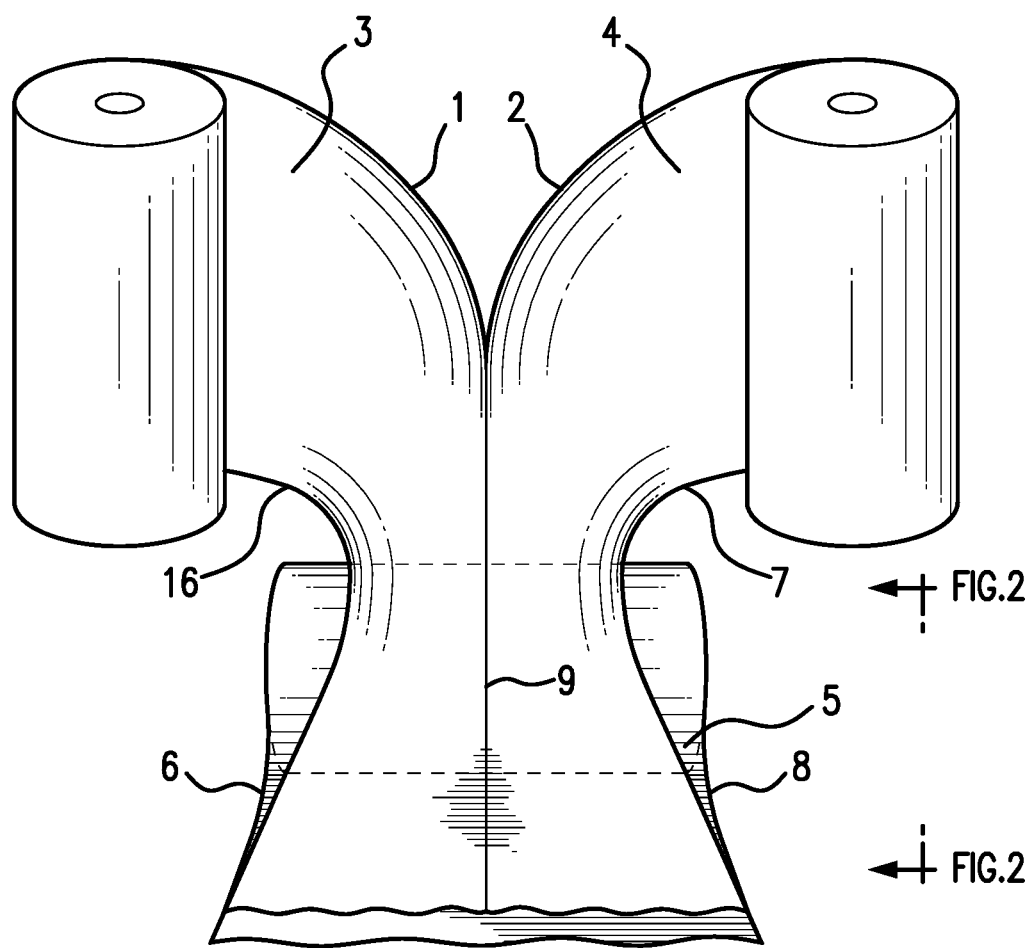
FIG. 1 shows a three-roll operation for assembly of a tri-web based bag.

The subject matter of the present disclosure relates to a method for producing recyclable bags using insulating material.

In one embodiment, the present disclosure relates to a process for producing bags comprising feeding a bottom web, a first side web and a second side web in a conversion process, each of the webs having a first side edge and a second side edge, wherein the first side edge of the first side web is aligned with the first side edge of the second side web, the second side edge of the first side web is aligned with the first side edge of the bottom web, and the second side edge of the second side web is aligned with the second side edge of the bottom web, thereby forming an inverted T-shaped web comprising a base having first and second wing portions and a riser oriented perpendicular to the base, wherein the first wing portion comprises the bottom web and first side web, the second wing portion comprises the bottom web and the second side web, and the riser comprises the first and second side webs. Then the first side web is sewed to the bottom layer in the first wing portion with a repeating pattern comprising a truncated triangle shape having a narrow portion and wider portion, and a tab separating the triangles, wherein the narrow portion of the triangle points toward (faces) the second side edge of the first side web. The second side web is also sewed to the bottom layer in the second wing portion with a repeating pattern comprising a truncated triangle shape having a narrow portion and wider portion, and a tab separating the triangles, wherein the narrow portion of the triangle points towards (faces) the second side edge of the second side web. The first and second wing portions are then contacted by folding them toward each other, thereby forming a folded web, and then the folded web is rotated to the horizontal. Then the first and second webs are sewn together in the riser with a repeating pattern comprising a flat-bottomed U with tabs separating the repeating U's, where the flat bottom of the U faces the first side edge of the first and second side webs, and the tabs separating the flat-bottomed U's bisect the triangles in the first and second wing portions, thereby forming a web of sewn bags. The web of sewn bags is cut along the edge to remove the sewn portion of the riser corresponding to the flat bottom of the U parallel to the edge, thereby forming a web of open top bags. Finally, the web of open top bags is transversally cut at the middle of the truncated triangles and by bisecting the repeating U's, thereby forming separate bags. The triangular portions still connected to the resulting edge of the now bisected triangle are now scrap and can be removed, either using a cutting device or by a pre applied perforation or similar method. An alternative to the U is a V shape of similar orientation that ends at a sharp angle instead of a flat one although a U shape is preferred. Moreover, an alternative to the truncated triangles mentioned above are non-truncated triangles, although truncated is preferred. The triangular shapes mentioned are a general description of how the preferred sewing method is applied i.e. they describe the general shape of connection and if for instance there were small deviations in the shape of the connection, the general shape is still triangular.

This process allows automated production of an square bottom insulated bag with no need for further hand applied connections or subsequent work. Such bags can provide better orientation inside the box and easier closure after insertion into the box, and be equipped with easy tear applications to allow opening. They can also be equipped with a carrying handle to allow the bag to be used for deliveries or shopping. Further, the bags can be compressed and stored in compressed form to save space in the warehouse or during transport to save on shipping rates. Preferably, the material used for the bag is cellulosic material, and preferably, the cellulosic material utilizes tissue that can either be embossed, not embossed or creped. Bags produced by the process have the additional advantage that liquid absorbent layers may be incorporated during the production of the multilayer tissue, as opposed to adding them when converting into a bag. Such materials include paper material that is thicker that the tissue itself; such as 30 lb paper, or paper similar in weight and feel to traditional copy paper.

Such a bag can include an extended lip for closure purposes, with or without a fastening device, and can be utilized inside a corrugated shipping carton, or other shipping device or singularly, without a secondary shipping device. A carrying handle can also be fashioned by applying a handle to the bag or by removing a portion of the bag to allow a hand hole to be formed. This hand hole can be strengthened to prevent tearing using a strengthening layer of material. Addition of layers of materials can also be used to strengthen the material for the application of a hand-hole. Specifically, when manufacturing a multi layer tissue material for the construction of the said bag, materials such as EVOH or PVOH or other water soluble materials can be added within the layers to improve tear strength of the weakened portion where the hand hole is applied. Such layers are preferably hidden so as to not communicate a product containing not water soluble film since any film can communicate a mixed material product that is difficult to recycle. This film is preferably laminated to one or more layers of the paper or tissue using a preferably water soluble connection method.

The automated manufacture of a three dimensional insulating bag using three webs of cellulosic material is described more closely where a three webs are used and the two top layers will serve as the sides of a bag along with a third bottom layer. The top two webs are bent to allow their bottom lower edges to align with the edges of the bottom layer. The bottom web will serve as the bottom side of the bag. A novel connection method is used, wherein a continuous connection method is applied to connect the top two webs to the bottom web along the both edges of the bottom layer. While connecting the edges, the connection methods moves toward the bends at the top layer at preferably a 30-60 degree angle, more preferably a 40-50 degree angle then descends back toward the edge at a 40-50 degree angle creating repeating truncated triangular connection patterns. The bending of the top webs is to facilitate the connection method and is done so when necessary. The distance that the applied connection moves away from the edge defines the expansion capability of the finished bag. The distance between the apexes of this side connection method defines the general length of the bag. An additional continuous connection is used to further connect the webs in order to connect the ends of a bag along the side edges above the truncated triangular portions, then toward the apex of the truncated triangular connections while moving perpendicular to the side edges toward center of webs, then back toward top edge to continue along the edge; the connection repeats to apply the same pattern at all triangular connections previously made. The connections of the bottom edge creating the truncated triangular forms and those for the top edge can be applied in any order. A disconnecting step is applied to remove undesirable portions of the materials, connections and to segment individual bags. The webs can be oriented to prevent undesirable connections to multiple layers then reoriented as necessary to work with a connecting device, i.e. when sewing. An alternative to three webs is less than three webs that are fashioned by bending or folding into a configuration that allows the described assembly. The preferable connection method is sewing. Top and bottom designations only indicate how the various webs are orientated relative to each other; therefore the described webs can be processed as described above in any relative position to a horizontal position. Any connection method that applies the expanding bottom portion of the article by applying an angled connection relative to bottom or top edge can be used. When automated sewing is utilized, a method to discern the thread from the cellulosic material using contrasting colors or other method can facilitate the process. A water soluble thread is preferred in that it will dissolve and not require removal when used with a paper material that is being recycled after use.

Since the connected edges of the bag can create a protrusion along the sides with a connection, such a protrusion can create an inefficient in fit when the liner is used to line square shaped carton wherein the protrusions when placed against the side of box press the sides of the bag inward, possibly reducing payload capabilities. A preferable insertion method of the bag into a box that can provide more space efficiency, is to orient the bag in a way that places the connected edge of the bag along the corners of the carton. This allows the corners of the carton, typically 90 degree angles, to accommodate the protruding connected edges providing a flatter abutment of the sides of the bag along the four sides of the carton. Additionally, when closing the bag, if the top edges are abutted using adhesive or other connection methods, the portion of the connected bag ascending above the top edge of the carton created a large cumbersome structure that must be lowered and placed into the carton to allow a closure of the carton. This can make closure of the carton difficult. A preferable closure method is for the connected portions below the closed top of the bag to be pushed in where a sinusoidal shape is created by two opposite edges that are sandwiched between the other two flat edges, when viewing the edges of the bag from above. All these edges can be sealed together when an adhesive or other closure device is used therefore sealing or closing the bag top. This "milk carton" style closure creates a neater and more compact closed top of the bag and facilitates the less forced lowering into the carton to allow the closure of the top flaps

DETAILED DESCRIPTION OF THE INVENTION

The following are features of the invention, including a description of the manufacturing process and the materials involved.

In one embodiment, the present disclosure relates to a process for producing bags comprising feeding a bottom web, a first side web and a second side web in a conversion process, each of the webs having a first side edge and a second side edge, wherein the first side edge of the first side web is aligned with the first side edge of the second side web, the second side edge of the first side web is aligned with the first side edge of the bottom web, and the second side edge of the second side web is aligned with the second side edge of the bottom web, thereby forming an inverted T-shaped web comprising a base having first and second wing portions and a riser oriented perpendicular to the base, wherein the first wing portion comprises the bottom web and first side web, the second wing portion comprises the bottom web and the second side web, and the riser comprises the first and second side webs. Then the first side web is sewed to the bottom layer in the first wing portion with a repeating pattern comprising a truncated triangle shape having a narrow portion and wider portion, and a tab separating the triangles, wherein the narrow portion of the triangle points toward (faces) the second side edge of the first side web. The second side web is also sewed to the bottom layer in the second wing portion with a repeating pattern comprising a truncated triangle shape having a narrow portion and wider portion, and a tab separating the triangles, wherein the narrow portion of the triangle points towards (faces) the second side edge of the second side web. The first and second wing portions are then contacted by folding them toward each other, thereby forming a folded web, and then the folded web is rotated to the horizontal. Then the first and second webs are sewn together in the riser with a repeating pattern comprising a flat-bottomed U with tabs separating the repeating U's, where the flat bottom of the U faces the first side edge of the first and second side webs, and the tabs separating the flat-bottomed U's bisect the triangles in the first and second wing portions, thereby forming a web of sewn bags. The web of sewn bags is cut along the edge to remove the sewn portion of the riser corresponding to the flat bottom of the U parallel to the edge, thereby forming a web of open top bags. Finally, the web of open top bags is transversally cut at the middle of the truncated triangles and by bisecting the repeating U's, thereby forming separate bags. The triangular portions still connected to the resulting edge of the now bisected triangle are now scrap and can be removed, either using a cutting device or by a pre applied perforation or similar method. An alternative to the U is a V shape of similar orientation that ends at a sharp angle instead of a flat one although a U shape is preferred. Moreover, an alternative to the truncated triangles mentioned above are non-truncated triangles, although truncated is preferred. The U and V shapes mentioned are a general description of how the preferred sewing method is applied i.e. they describe the general shape of connection and if for instance there were small deviations in the shape of the connection, the general shape is still U and V shaped.

Materials of Construction

The materials utilized to construct the bag can be any material suitable to serve as insulation material, such as multi-layer paper tissue material, recycled textile containing material, bonded paper fiber material or other insulation material that is environmentally friendly and can wound and unwound as a web of material. Preferably, the materials are cellulose-based. For the purposes of this specification, the term cellulose-based in the context of the liner walls means a material containing cellulose that can be in web or sheet form. Examples of such materials include cellulose-wadding and creped paper, also known as Custom Wrap™ wadding commercially available from Sealed Air Corp. or VersaPak™ cushioning products commercially distributed by NPS Corp. of Greenbay, Wis. Preferably, the materials of construction are multiple connected layers, preferably of kraft unbleached tissue. More preferably, the multi-layer materials of construction are creped or wrinkled. Multi-layer tissue can also be used in embossed or un-embossed form. Other examples include paper pulp that is bonded together using a water soluble binding agent including; Poly lactic acid (PLA), starch containing binding agents or any water soluble or non water soluble binding agents or water soluble polymers.

Preferably, the materials of construction of the walls or panels of the liners are recyclable, as defined below. More preferably, they are fully recyclable. Most preferably, they are perfectly recyclable. The term recyclable means greater that 50 wt % of the material is recyclable, based on the total weight of the liner. The term fully recyclable means that essentially all (i.e., greater than 90 wt %) is recyclable. The term perfectly recyclable means that 100 wt % of the material is recyclable. For the purposes of this specification, the term recyclable refers to the recycling process for cellulose-based materials such as paper, paper products or tissue. Thus, to be recyclable, the material must be paper, paper products or tissue, must be repulpable, i.e., water soluble in the repulping process, and can be biodegradable and compostable. Preferably, to be recyclable, the material should have fiber qualities meeting particular dimension requirements as described below.

Materials for the liner can be manufactured from the combining and connecting of multiple layers of cellulose-based tissue materials that are themselves manufactured in a tissue manufacturing process, using mechanical treatment that includes crimping, embossing, gluing, stamping and connecting. Preferably, a tissue paper manufacturing process is utilized that creates a wrinkling in the individual layers of tissue or any other method of creating voids or air pockets in between the layers. Tissue layers manufactured by either method can be later combined and attached to one another to provide insulative properties, so that while compared to non-wrinkled or flat tissue, the treated tissue provides superior insulation. Another method of improving the insulating value of the combined material is to subject the unwrinkled finished dry tissue in the web, work-in-process or finished article form, to a wrinkling process including re-moistening and heating or drying, chemical wrinkling, moistening and cooling, or the use of two or more of these processes. Preferably, the tissue paper is produced by combining tissue material that is creped while it is manufactured. Since tissue paper tends to demonstrate high liquid absorbency that can weaken or soil the article, articles manufactured using it can be improved by adding a layer of heavier weight, smoother texture paper material or other material with lower liquid absorbency. Such layers can be applied during the manufacturing of the multilayer tissue process, while such material is applied to one or both surfaces of the material. Materials with less absorbency can also be added during the conversion process of bags and connected to desired sides of the bag then.

Preferably, the liner described above is manufactured using cellulose materials such as kraft or unbleached natural colored tissue, or bleached tissue. Lighter colored papers including covering layers may provide reduced heat absorption properties in some applications and therefore provide superior protection against heat. The primarily paper construction when used in conjunction with water-soluble adhesives yields a liner that is largely recyclable where recyclers use a process that first creates a pulp material that is later turned into more paper materials. Although recyclability of a material can change from time to time due to market demands for a particular grade of material, less processed cellulose materials are preferred in that they consist of longer cellulose fibers that are more desirable to recycling facilities. For the purpose of this specification, the term less processed cellulose materials means cellulose material that has been through one or fewer recycling processes. Longer cellulose fibers provide greater strength to products manufactured using them, and are therefore more desirable for and graded higher by recyclers. Comparatively, products made using macerated newsprint which consists of shorter fiber cellulose material of lesser value when graded by recyclers and are possibly sent to landfills instead of being recycled. Preferably, to be recyclable, the average fiber length of the pulped fiber is 0.7 to 3.2 mm. More preferably, the average fiber length of the resultant pulped fibers produced in the recycling process is from 0.824 to 3.2 mm. When the pulped fiber is tissue material, the average fiber length of the pulped fiber is more preferably from 1.0 to 3.2 mm. When the pulped fiber is not tissue material the average fiber length is more preferably from 0.824 to 0.744 mm. To be recyclable, preferably, the average fiber width of the pulped non-tissue fibers are from 20.8 to 19.8 µm, and preferably, the fiber shape factor of the pulped non-tissue fibers is from 90.1 to 89.3. The average fiber length, average fiber width and fiber shape factor are as described in Recycling of the Hardwood Kraft Pulp, Geffertova et al, Technical University in Zvolen, Faculty of Wood Sciences and Technology, March 2012, 2 www.intechopen.com, p 270-275.

Although cellulose tissue materials are natural insulators due to their constitutive fiber's low heat conductivity, multiple layers of tissue are preferred in that they provide multiple air pockets between such layers that further slow the transfer of heat through sheets or panels made of the same. In the preferred creped form, even more air pockets are contained that further retard heat flow resulting in enhanced insulation performance. Here, heat flow indicates flow from one side of a layer of the tissue or multiple layers to the other side, i.e. through a top layer to the other side bottom layer and out.

Insulation performance can be improved if a layer or multiple layers of metalized paper or tissue are connected to the multilayer tissue material. Such metalized materials must not render articles containing them non-recyclable. The metalized paper or tissue acts to reflect heat energy away as well as reduce vapor transmission, both of which can affect thermal performance. Also, any applied treatment of one or more layers or added layers of materials that reduce vapor transmission through the material can be added or applied to the multi-layer cellulose material in order to enhance its insulative properties. Preferably, such treatment does not render articles made of the same non recyclable.

Paper material such as 401b or lighter unbleached, when attached to the multi-layer cellulose tissue material on one or both sides, can allow the production of the aforementioned bags.

Additionally, attached paper material or treated tissue material on the inner and outer layers of the multi-layer cellulose material that is treated to present static dissipative, electrostatic discharge protective properties, electrically dissipative or to be conductive facilitates the production of a fully recyclable cushioned pouch that can be used to protect electrostatically sensitive electronic devices during transport and storage. Inner and outer layers of such paper or tissue can have a variety of these properties i.e. the outer layer can be conductive while the inner most that touches the electrically sensitive device can be dissipative.

Additionally, attached paper material or treated tissue material on the inner and outer layers of the multi-layer cellulose material that is treated to present static dissipative, electrostatic discharge protective properties, electrically dissipative or to be conductive facilitates the production of a fully recyclable cushioned pouch that can be used to protect electrostatically sensitive electronic devices during transport and storage. Inner and outer layers of such paper or tissue can have a variety of these properties i.e. the outer layer can be conductive while the inner most that touches the electrically sensitive device can be dissipative.

Connecting Element

When necessary, the connecting elements used in the bags of the present invention include water-soluble adhesives, starch-based adhesives and cellulose-based fastening devices or combinations thereof. Edge connecting materials such as paper-based tapes using water soluble pressure sensitive acrylic, non-water soluble, water soluble, or starch-based adhesives can be used. The adhesives can be applied directly to the panels of the liner, or indirectly as part of a tape, where the adhesive is on one side of a tape, and the adhesive is between the tape and the article edge. Water activated starch adhesives tape with a pre-applied adhesive, for example "Central 160 WAT Non Reinforced Gum Tape," is commercially available from Central.

For storage, completed articles can be collapsed by a tucking in and folding the square bottom panel, side panels, end panels or any combination of one or more of these panels, allowing the collapse and folding of the bag. This provides very helpful size reduction advantages that greatly increase transport and storage efficiencies. Finished articles can be collapsed to save space. Individual or lot quantities of articles can be compressed and maintained in compressed form for storage and transportation. Such storage can include mechanical devices such as plastic outer bags, twine or other rope like device or vacuum plastic materials.

The insulation value at the seals can be enhanced by an overlapping of the edges prior to connecting using any mentioned tape or other method. This can be achieved with an offsetting of the edges when stacked or overlapping of the edges when laid flat.

The top of the finished article can be closed after contents have been placed inside. Since the multilayer tissue material may in some applications be too delicate for application of traditional peel and seal tape devices, alternative closure methods may be necessary. For example, after the process above manipulating the pouch is performed, a cellulosic adhesive tape type material of adequate width to join and hold closed the top edge of the finished article, is applied to the top edge or edges that will serve as the closure device at the top of the finished liner. For the purpose of this specification, the term cellulosic in the context of adhesive tape means a strip of paper made primarily of cellulose fiber material with a water soluble adhesive that is pre-applied during production of the tape or thereafter. Any adhesive can be utilized on the cellulose tape but is preferably water soluble such as a starch-based water activated adhesive; preferably the adhesive is a proper acrylic type adhesive. For the purpose of this specification, the term pulpable in the context of the tape means that it yields paper pulp or it does not interfere with a paper recycling process Preferably, the tape applied to one or both top edges has two adhesive attachment methods, one for application onto the edge of the article in the manufacturing process and one for the user of the article to peel off and affix when connecting the article shut after filling with contents. More preferably, the paper tape presents a pure water soluble pressure sensitive adhesive with a removable liner that when removed, exposes the adhesive still adhered to the layer it was applied to and allowing the joining and attachment to the same that has been applied to facilitate adjoining of the edges to the opposite edge of the bag. The tape device on the opposite edge can be with or without adhesive and also extends above the top edge of the bag. Any adhesive, including water soluble or not water soluble, can be used for the closure of the top edge.

A variation of this application of taped top edges as a closure method can be a type of edge banding that helps with preventing fraying where the edges are enveloped with adhesive tape. Any of the mentioned connecting methods can be used to prevent fraying, whether applied when connecting layers of multi-layer cellulose based material or as an edge treatment. When sewing is used, 'over-edge' sewing can help prevent fraying when used for that purpose only and when used for connecting edges. One or both such enveloped edges can be then affixed with an adhesive device, like peel and seal tape, on one or both outer surfaces of the tape so as to facilitate closure of the top of the article by an adjoining of the banded edges of the article.

In another method, a strip of adhesive transfer tape is applied to the top edge of the web where a future top edge of the cellulosic material bag will be. Such a transfer tape will be applied with a peel off liner that will remain affixed to the adhesive and liner until it is used. When ready for use, the user simply peels off the liner to expose the adhesive, brings together the opposite top edges of the liner, a pressing step is performed then the liner top is connected and the contents are better protected. To facilitate the opening of the article by the recipient an easily removable or disconnecting top portion can be provided. A possible method is a perforation or other method to allow an 'easy tear' top portion of bag that will result in an opening of the bag.

If necessary, when a proper 'hot-melt' adhesive such as a protein containing, conventional hot melt and/or pulpable adhesives is utilized instead of a cold glue described in the processes above for joining edges, the wait time is significantly shorter, although similar steps must be followed to allow sequential step manufacture described above. An example of an hot melt glue is NP2068, a repulpable hot melt adhesive from HB Fuller of St. Paul Minn. Another hot melt adhesive example is H318-BG by Heartland Adhesives of Germantown, Wis. Since the multi-layer tissue material can fray or detach from one another, a tape or adhesive can be applied to the top unconnected edges of the article to secure the layers. Such an edge treatment can be applied in-line while unwinding the web of insulating tissue material or manually on each article. Any edge on the article can receive such an edge treatment.

Any adhesive type can be used for any connecting methods mentioned in this specification and can be used and removed during the recycling process using filtering, separation or other method when necessary.

An alternative method of protecting the inside of the liner from moisture can include the pre-treatment of a layer of tissue with a water repelling treatment that reduces the absorption of liquids by the first or subsequent layers of tissue. Preferably, the water repellent materials used are food safe for compatibility with edible goods that may be packed in the protective article. Examples of such water repellent materials are silicone treatments. Chemical treatment of the tissue materials that provides a water repellant effect but does not render such tissue non repulpable is preferred. For the purposes of this specification, the term non-repulpable in the context of the tissue materials means interfering with the paper recycling process due to the solubility characteristics. Specifically, components that are not water soluble cannot be re-pulped, may reduce the recycling value of the article and may interfere with the recycling process. They have to be removed or otherwise filtered from the process when paper products containing them are placed into recycling boxes. Also, components such as non-water soluble adhesive and chemical treatments are difficult or impossible to remove from tissue in that they are bonded to the tissue and may be therefore especially difficult to separate them so that portions of articles containing them cannot be re-pulped. Preferably, only the layer of tissue that is on the interior of the article touching the protected goods, is water repellant. An alternative water repellant feature is an absorbent device such as a removable absorbent pad that is applied to the bottom of said liner. Such a device will absorb water that collects over time due to condensation that is naturally more likely to collect at the bottom of the liner. Examples are extra tissue and superabsorbent materials such as the same cellulosic material. Paper materials that are heavier and less absorbent than tissue materials also provide helpful protection against moisture inside the article. Such materials, in treated and untreated form placed on the outside layers of the article can present advantages in wet weather protection when such articles are used for delivery of goods, or can be helpful in the conversion process by facilitating connection of panels.

Preferably, the open top of the liner is closed by overlapping or joining of the edges protruding above the carton and securing them with the adhesive tape. When both opposite edges of the article present a tape on the edge, the two faces of the tape can be affixed to one another.

Tear strips, visual identifiers or perforations can be applied to any closure method for the top to facilitate the opening of the bag by the recipient.

Since the connected edges of the bag can create a protrusion along the sides with a connection, such a protrusion can create an inefficient fit wherein the protrusions, when placed against the side of box press the sides of the bag inward, possibly reducing payload capabilities. A preferable insertion method of the bag into a box that can provide more space efficiency, is to orient the bag in a way that places the connected edge of the bag along the corners of the carton. This allows the corners of the carton, typically 90 degree angles, to accommodate the protruding connected edges, providing a flatter abutment of the sides of the bag along the four sides of the carton. Additionally, when closing the said bag, if the top edges are abutted using adhesive or other connection method, the portion of the connected bag ascending above the top edge of the carton created a large cumbersome structure that must be lowered and placed into the carton to allow a closure of the carton. This can make closure of the carton difficult. A preferable closure method is for connected portions below the closed top of the bag to be pushed in where a sinusoidal shape is created by two opposite edges that are sandwiched between the other two flat edges, when viewing the edges of the bag from above. All these edges can be sealed together when an adhesive or other closure device is used therefore sealing or closing the bag top. This "milk carton" style closure creates a neater and more compact closed top of the bag and facilitates the less forced lowering into the carton to allow the closure of the top flaps Starch adhesives can be used as well as hot melt and cold glues for the mentioned connecting methods.

Figure 2:
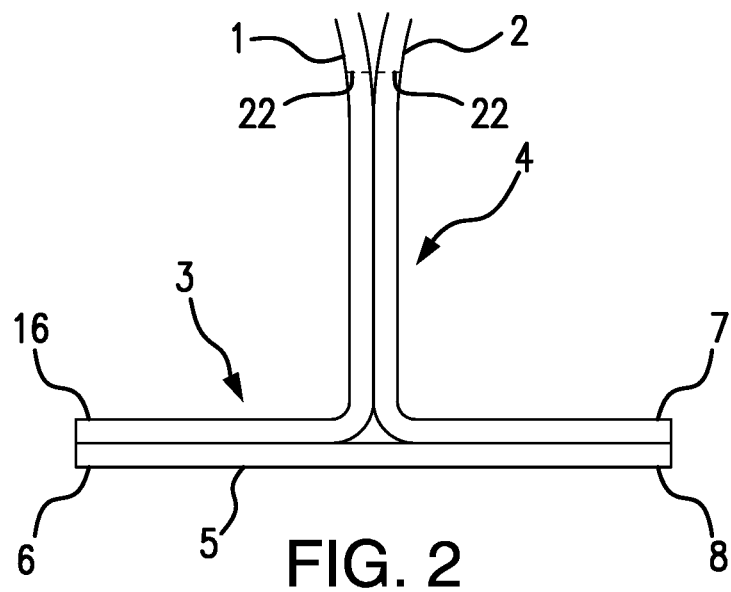
FIG. 2 is an end-view of the three webs from FIG. 1 being combined to form an inverted T shape material for construction of the bag.
Figure 3:
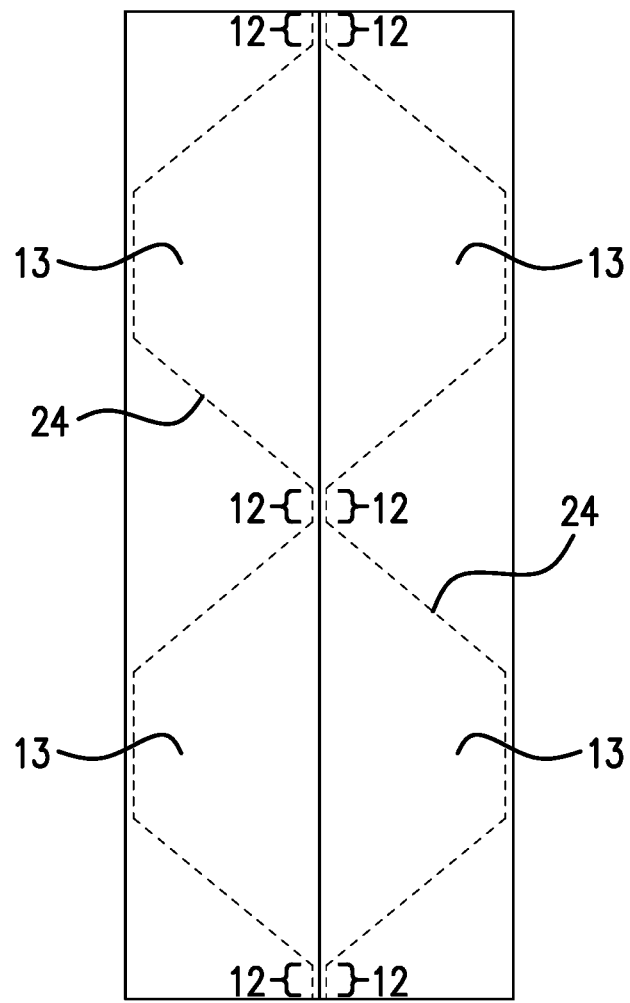
FIG. 3 is a perspective view of the inverted T after sewing, illustrating the stitching on the base.
Figure 4:
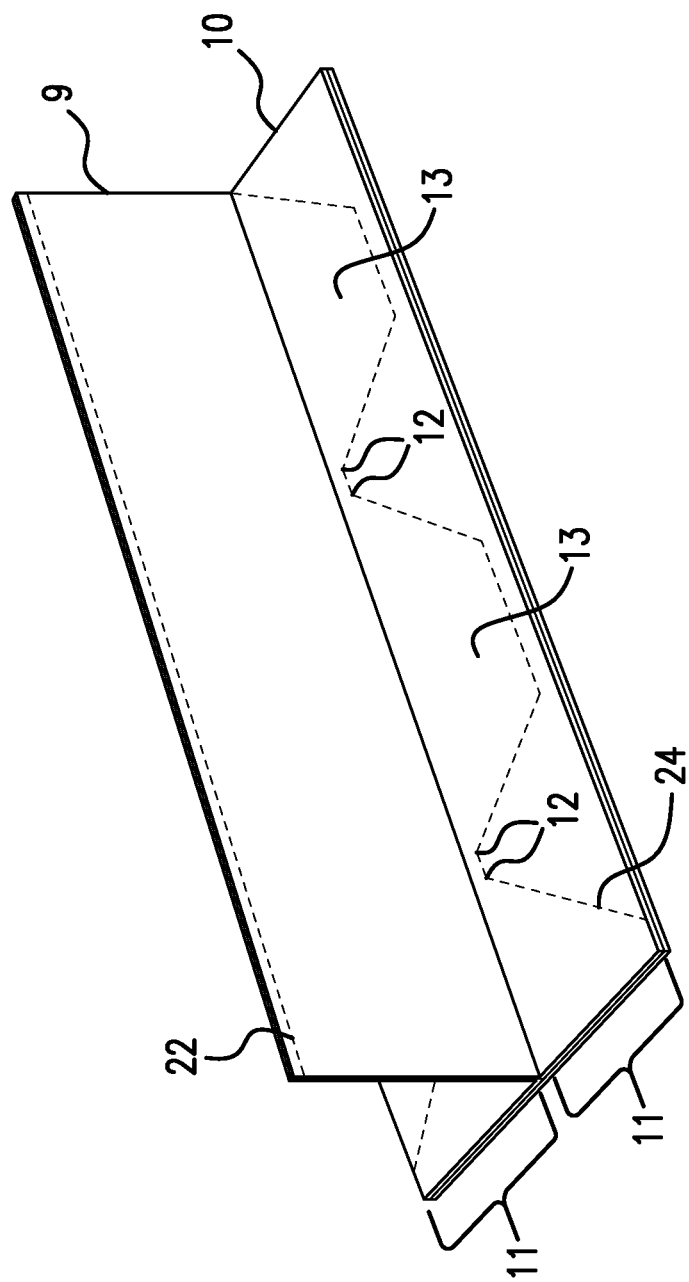
FIG. 4 is a perspective view of the inverted T web illustrating the stitching on the base and the over-edge stitching of the riser.
Figure 6:
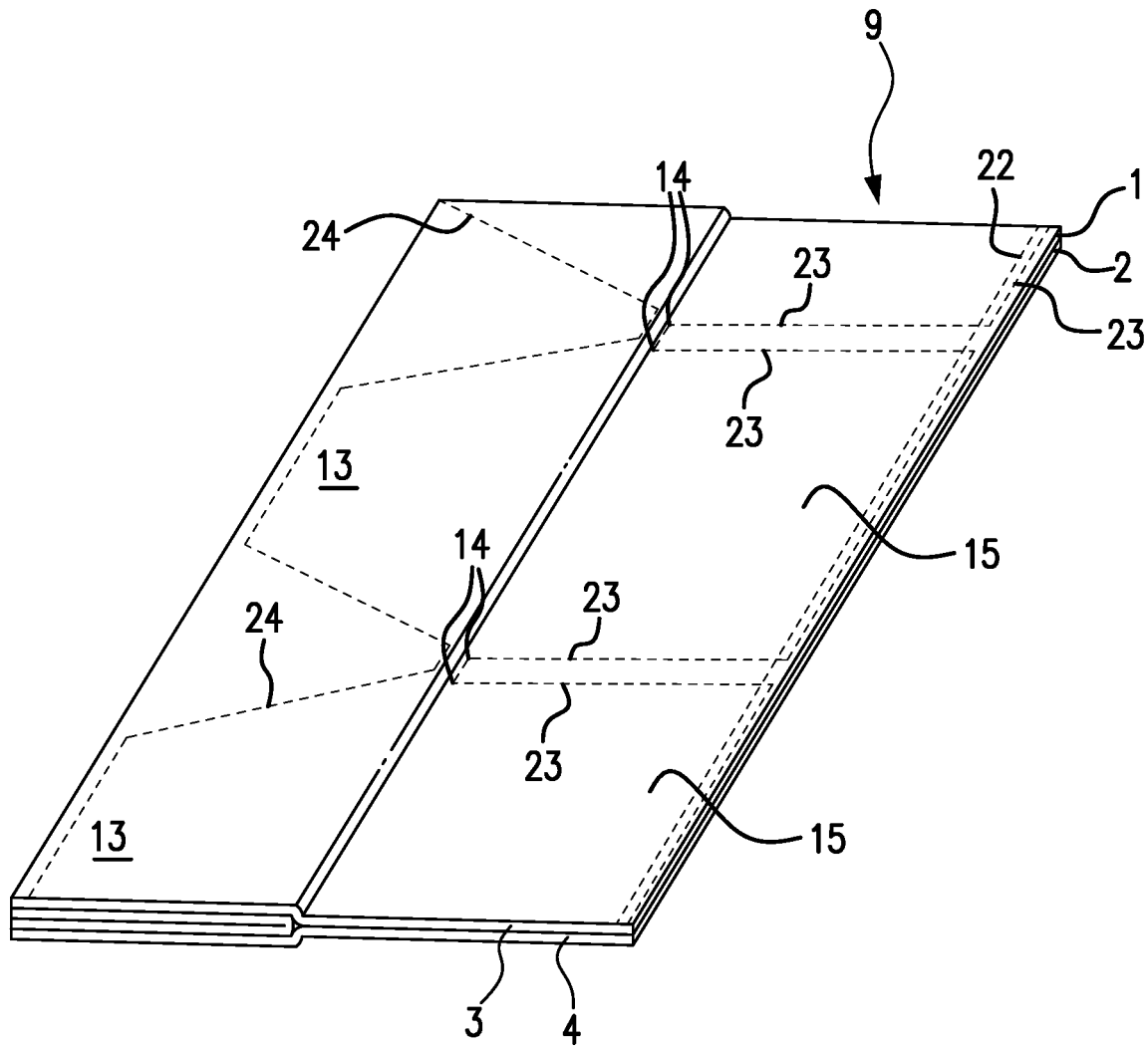
FIG. 6 is a perspective view of the folded and rotated web from FIG. 5B including the stitching patterns in both the base and the riser.
Figure 7:
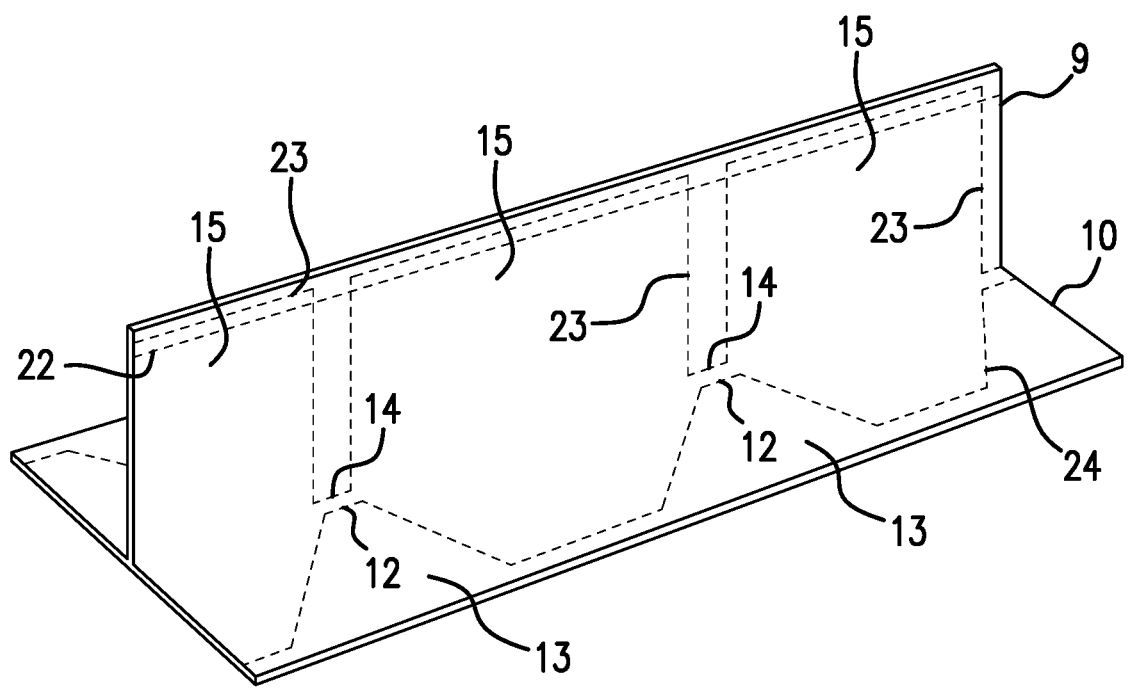
FIG. 7 is a perspective view of the inverted T web, including the stitching patterns in the base and the riser.
Figure 8:
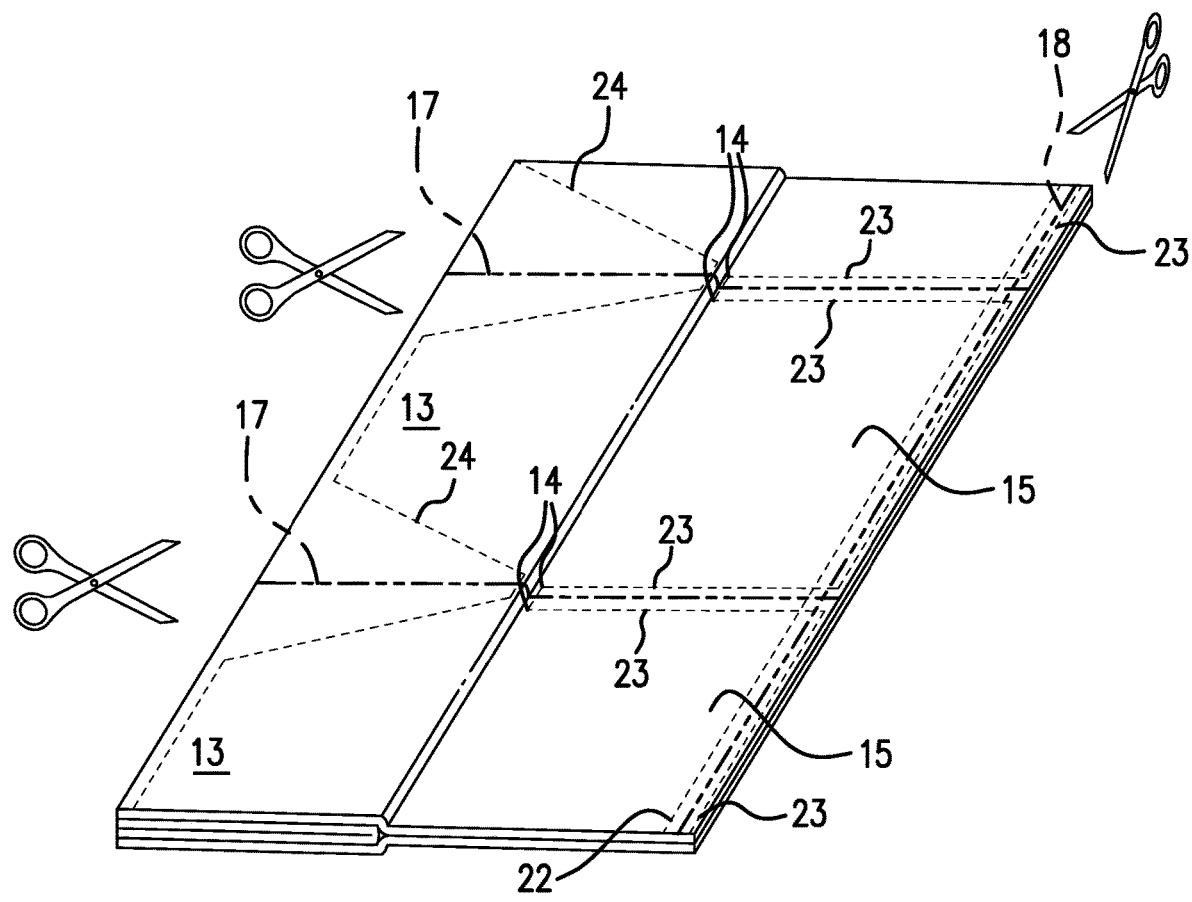
FIG. 8 shows the inverted T web as in FIG. 7 after it has been folded and rotated as in FIG. 5B, including cut lines.
Figure 9:
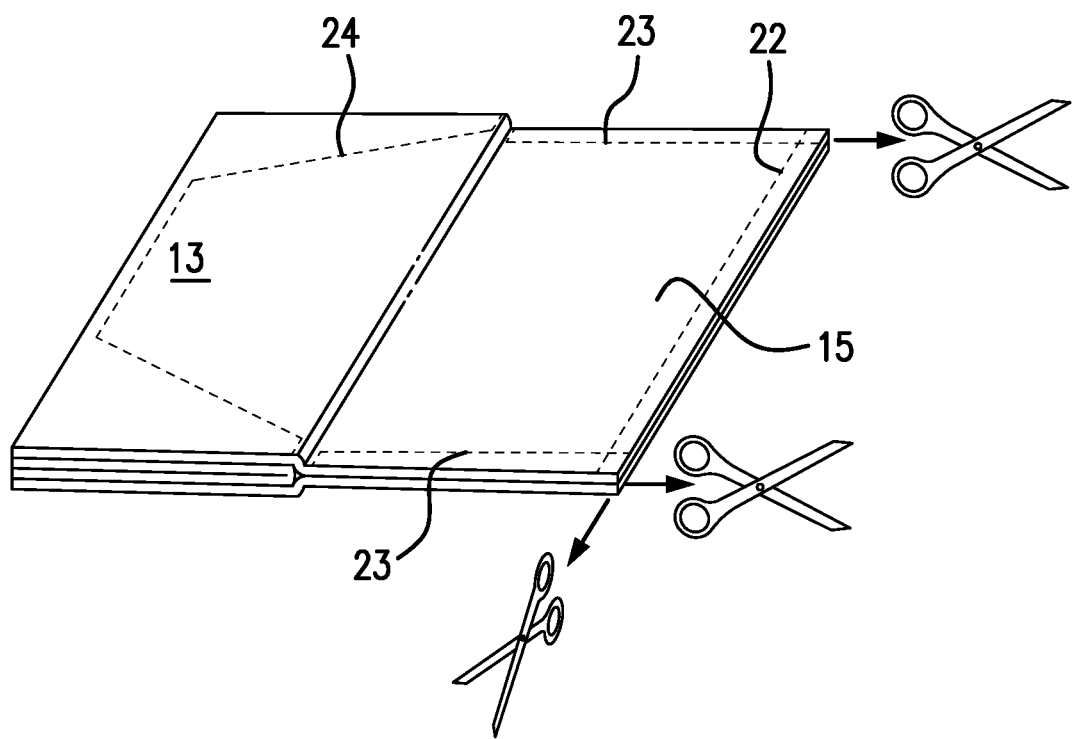
FIG. 9 shows the web of FIG. 8 after cuts have been made.
Figure 10:
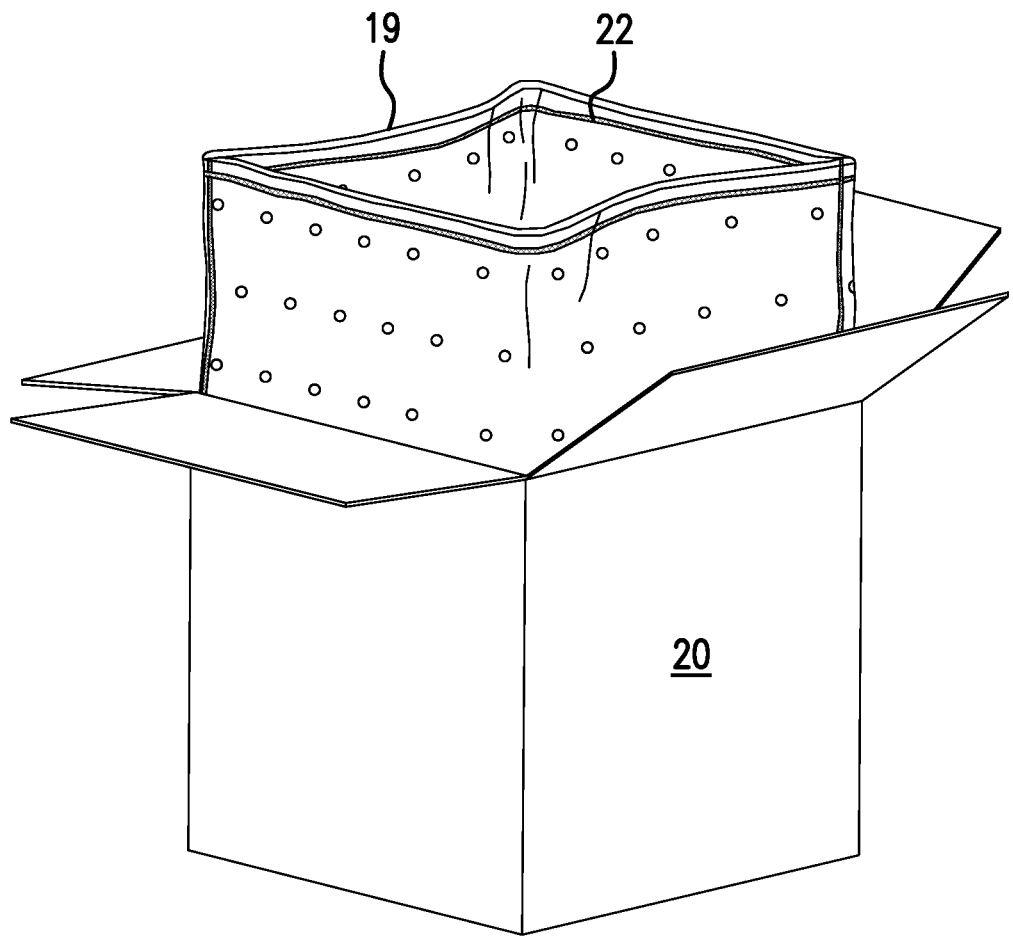
FIG. 10 shows a completed bag oriented in a preferred position inside a shipping carton.
Figure 11:
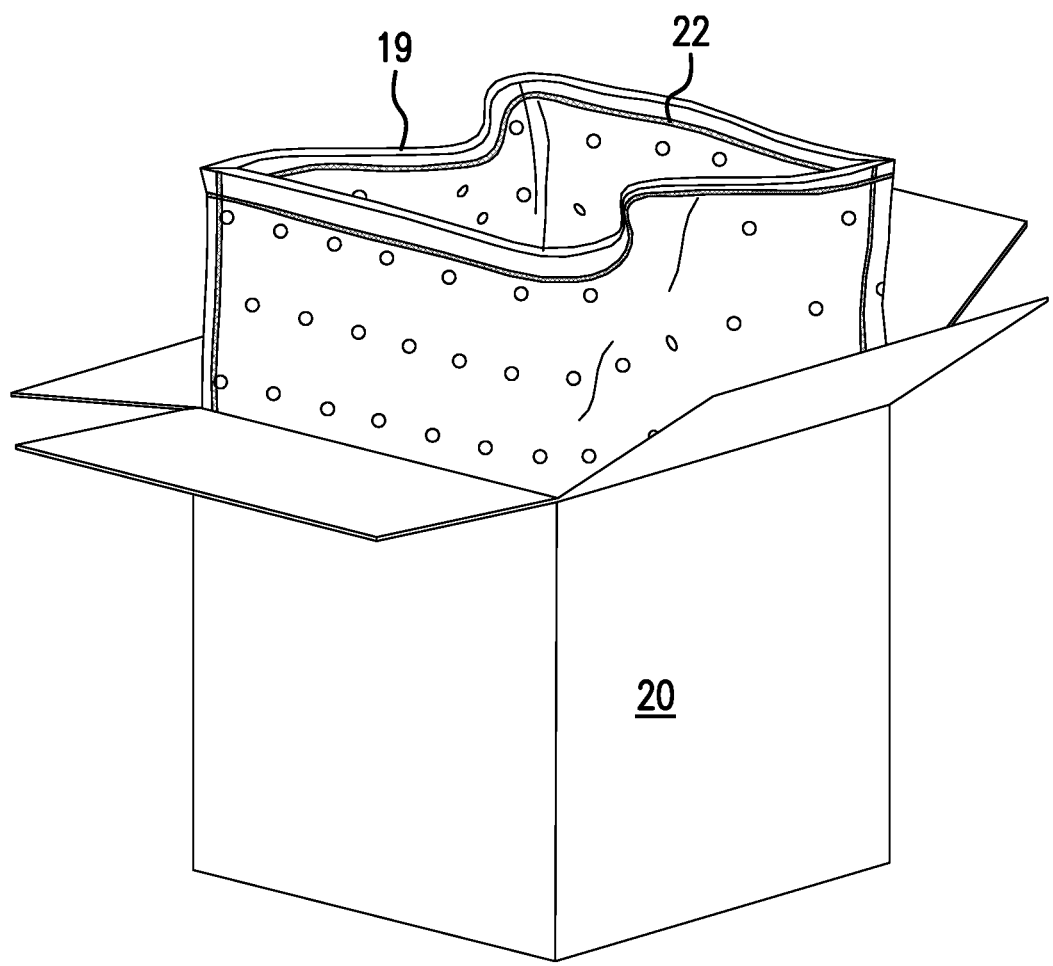
FIG. 11 shows a completed bag inside a shipping carton being folded into a preferred closure method for the top.
Figure 12A:
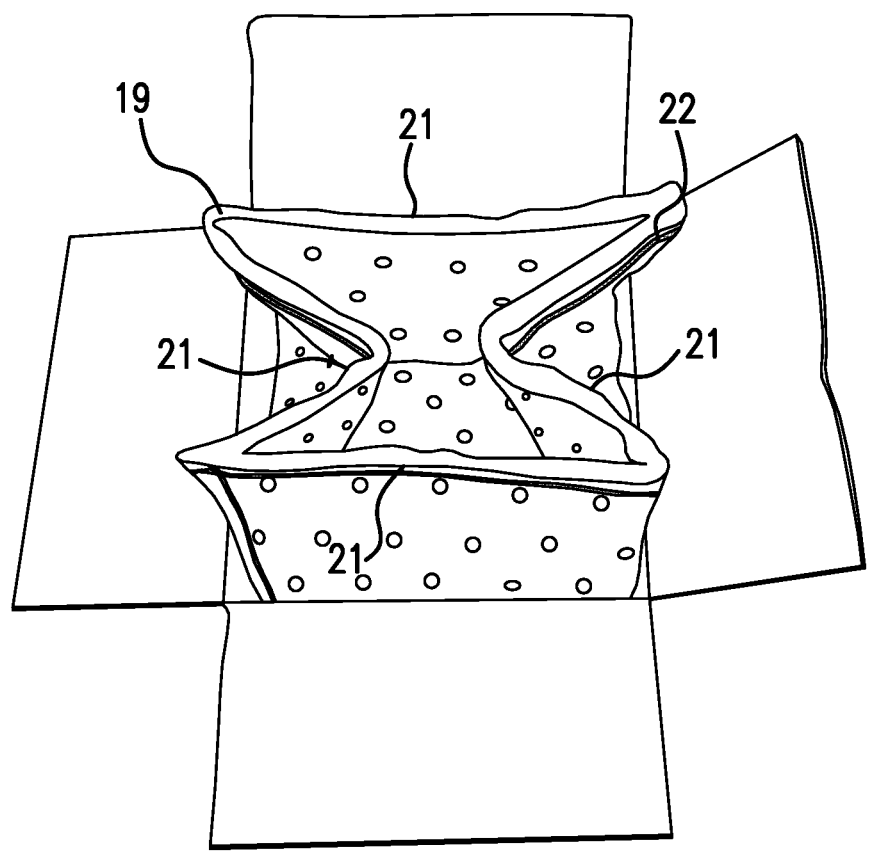
FIG. 12A shows a preferred sinusoidal closure method for the top.
Figure 12B:
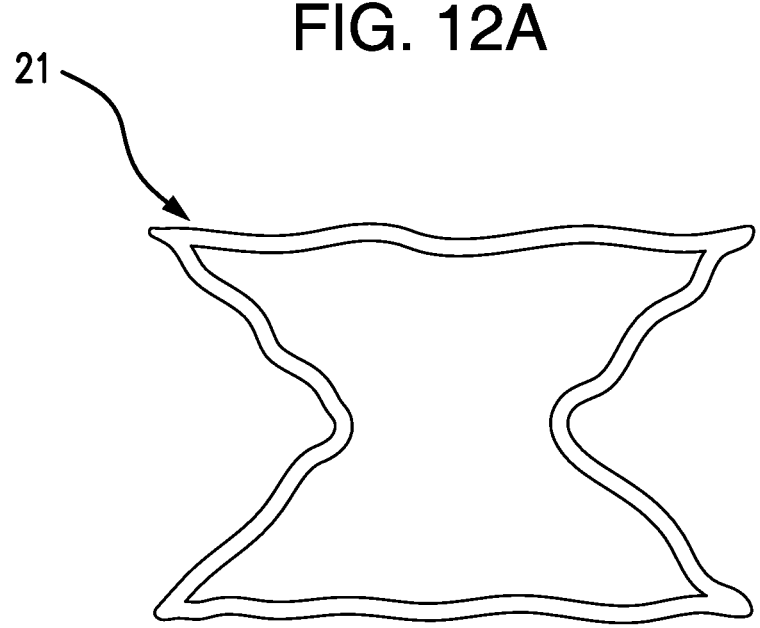
FIG. 12B is a representation of the sinusoidal or hourglass shape of the top edge when being folded into a preferred closure method.
Figure 13:
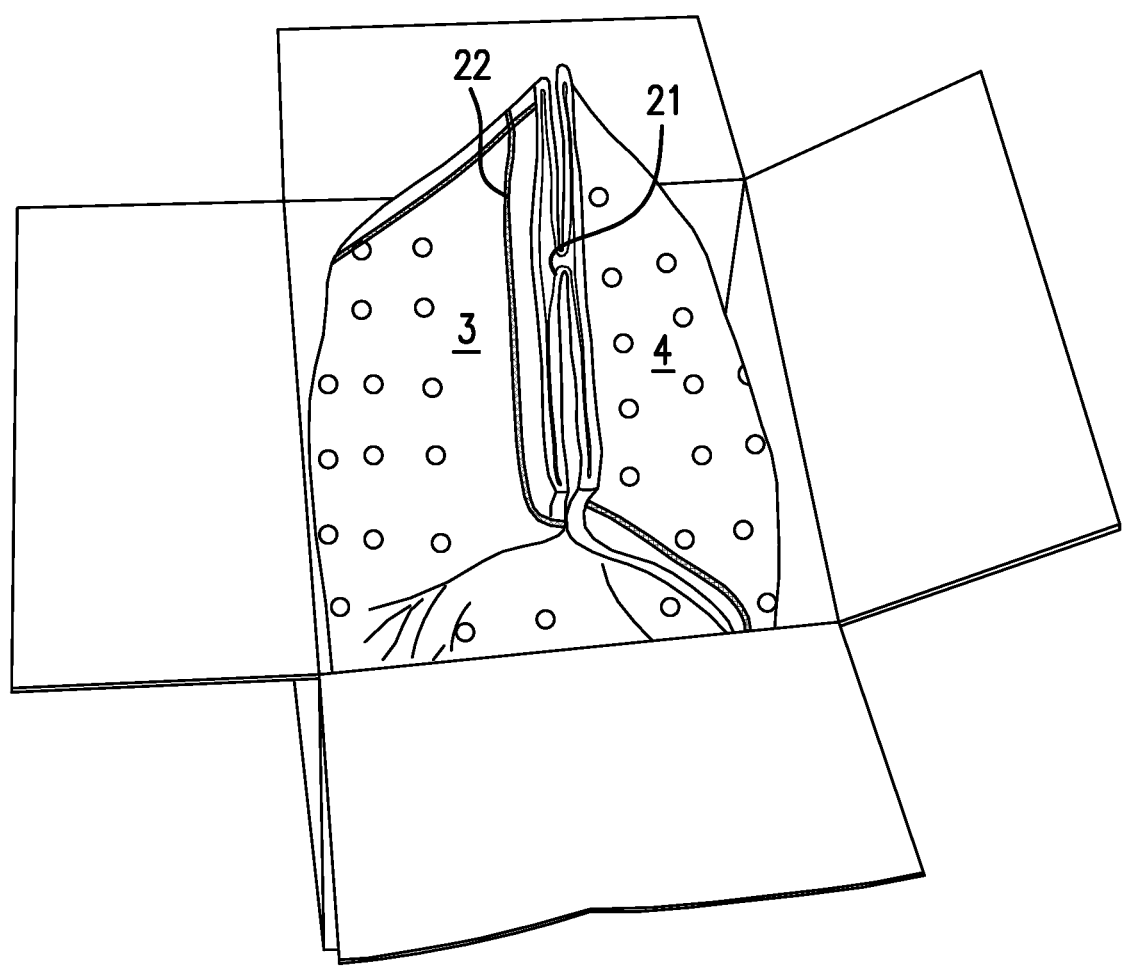
FIG. 13 shows a completed preferred closure method.
Figure 14:
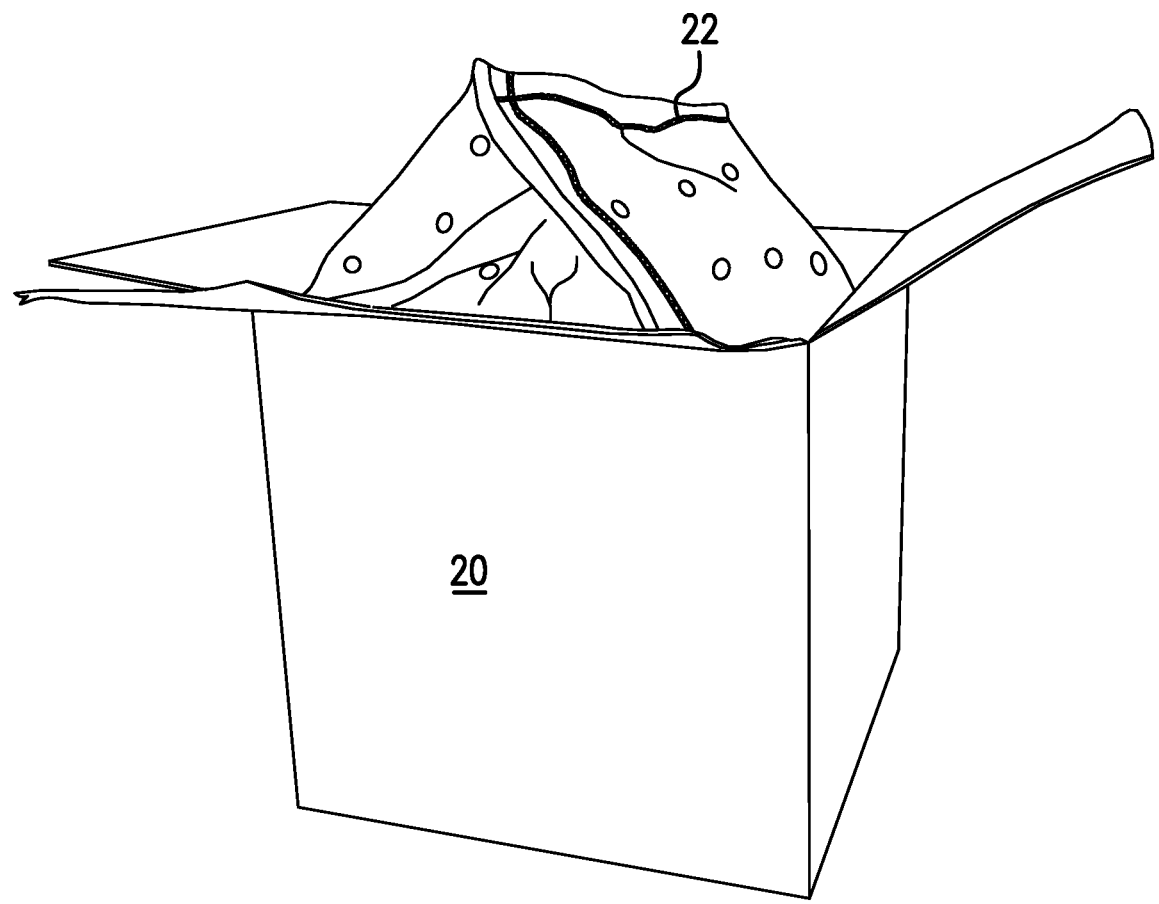
FIG. 14 shows a side view of a bag closed using a preferred closure method.
Figure 15:
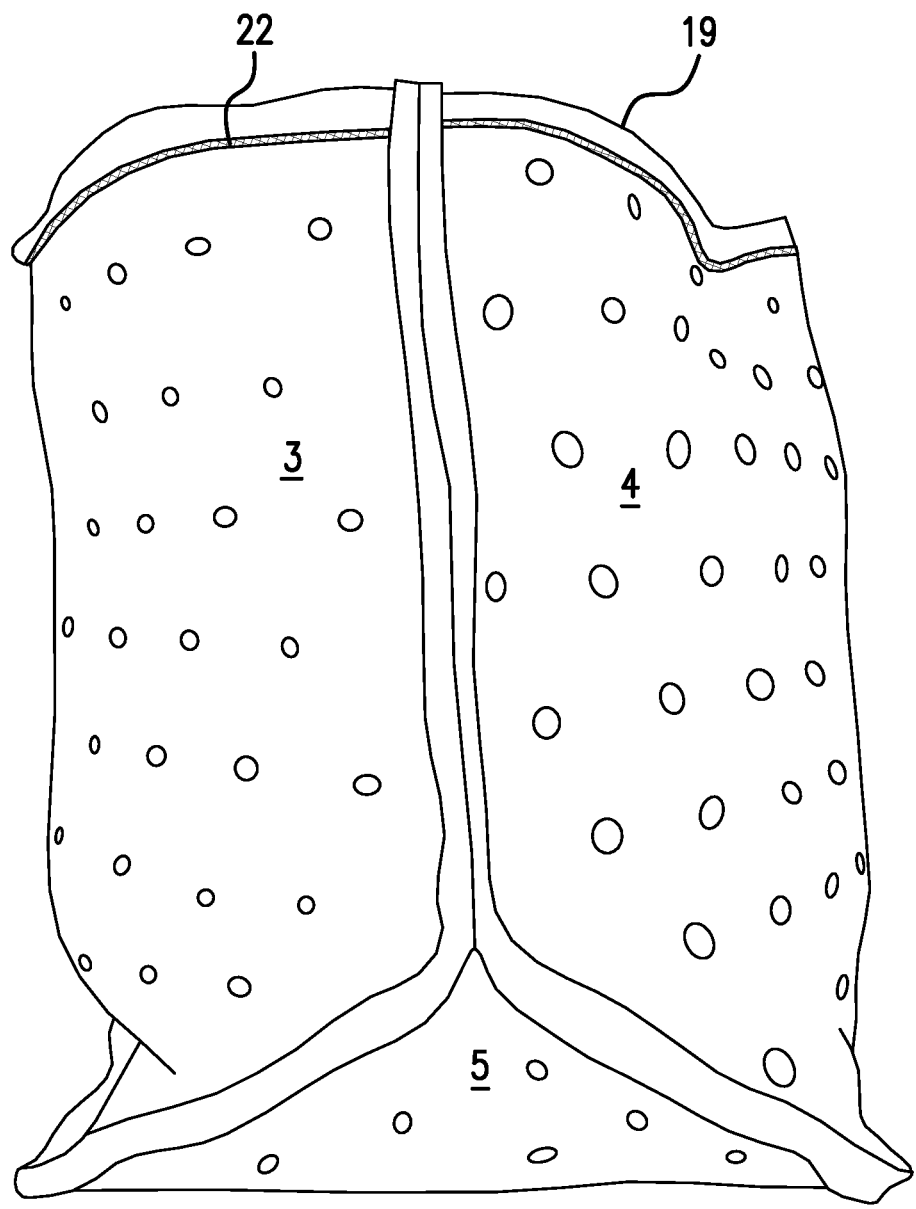
FIG. 15 shows the end view of a finished bag.
Figure 16:
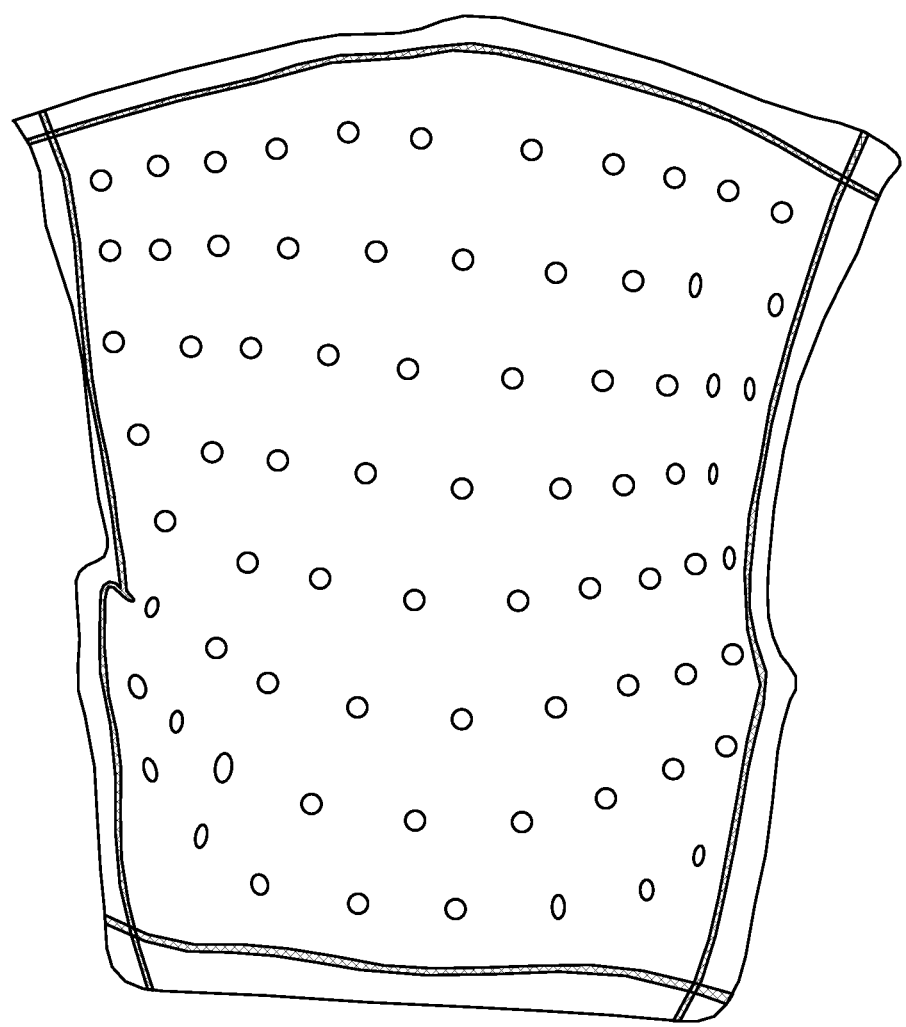
FIG. 16 shows the side view of a finished bag.
Figure 17:
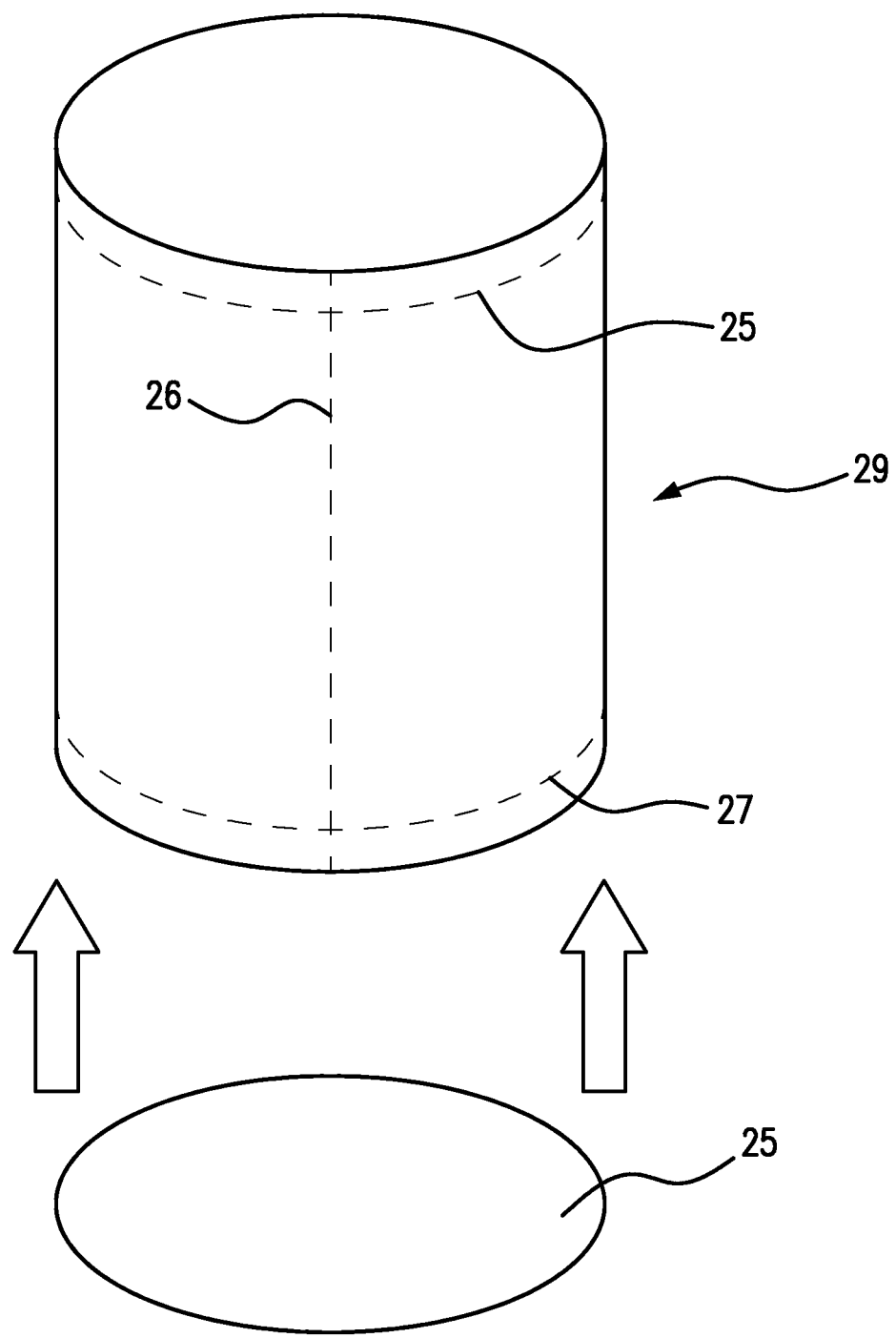
FIG. 17 shows a cylindrical bag.

Referring now to FIG. 1, it shows a perspective view of the process where three webs are brought into contact in the first step of producing the bag. First side web 3 having first side web first side edge 1 and first side web second side edge 16; second side web 4 having a second side web first side edge 2 and second side web second side edge 7; and bottom web 5 having bottom web first side edge 6 and bottom web second side edge 8 are the three webs joined. First side web first side edge 1 and second side web first side edge 2 are aligned, forming riser 9. First side web second side edge 16 and bottom web first side edge 6 are aligned. Second side web second side edge 7 and bottom web second side edge 8 are aligned. When the web material is cellulosic material, an over edge stitch 22 (not shown) may be applied to any/all of the individual webs near their edges to secure the integrity of the individual web and prevent fraying. For example, side web 3 may have an over edge stitch 22 near its edge 1. Referring now to FIG. 2, shown is an edge view of the three webs as produced in FIG. 1. First side web 3, second side web 4 and bottom web 5 form an inverted T shape where first side web first side edge 1 and second side web first side edge 2 are aligned in the vertical part of the T, first side web second side edge 16 and bottom web first side edge 6 are aligned on one section (wing) of the base of the inverted T, and second side web second side edge 7 and bottom web second side edge 8 are aligned on the other section (wing) of the base of the inverted T. Referring now to FIG. 3, shown is an overhead view of the inverted T shaped web of FIG. 2 after stitching of the first side web 3 and the second side web 4 to the bottom web 5. A truncated triangle pattern stitch line 24 is sewn on both sides of the centerline of the web corresponding to the vertical section of the truncated T. Repeating truncated triangle sections 13 are formed from the sewing, with the repeating sections 13 separated by tabs 12. Web material outside of the truncated triangle sections 13 and the truncated triangle pattern stitch line 24 can be discarded. Referring now to FIG. 4, shown is a perspective view of the inverted T of FIG. 2 consisting of base section 10 and riser 9. Base section 10 is divided into two wing portions 11 on both sides of riser 9, that are perpendicular to riser 9. Repeating truncated triangle sections 13 are formed from the truncated triangle stitch line 24 on the wing portions 11, with the repeating sections 13 separated by tabs 12. Truncated triangle stitch line 24 is performed while base 10 is oriented horizontally, since sewing must occur while the web is in the horizontal. Riser 9 contains over-edge stitch line 22. Referring now to FIG. 5A, shown is an edge view of the tri-web (first side web 3, second side web 4 and bottom web 5) in the inverted T configuration as in FIG. 2, where the wing portions 11 are folded back upon themselves, with first side web second side edge 16 and second side web second side edge 7 on the outside of the multilayer structure and bottom web first side edge 6 and bottom web second side edge 8 are on the inside. Referring now to FIG. 5B, shown is an edge on view of the folded tri-web configuration of FIG. 5A (first side web 3, second side web 4 and bottom web 5) after it has been rotated 90 degrees in the clockwise direction to the horizontal. In the folded section, first side web second side edge 16 and second side web second side edge 7 are on the outside of the multilayer structure and bottom web first side edge 6 and bottom web second side edge 8 are on the inside. Such a rotation is necessary to stitch first side web 3 to second side web 4 of riser 9, since the sewing must be performed in the horizontal. Referring now to FIG. 6, shown is a perspective view of the folded tri-web configuration of FIG. 5B. In riser 9, side webs 3 and 4 are stitched together using stitch line 23 in the form of a flat bottom U. Repeating flat-bottomed U shape sections 15 are formed, separated by tabs 14. On the folded base section, repeating truncated triangle sections 13 are formed from the truncated triangle stitch line 24, with the repeating sections 13 separated by tabs 12 (not shown). Over edge stitch line 22 is located on side web 3 and is positioned further from the side web edge 1 than flat bottom U stitch line 23. Referring now to FIG. 7, shown is a perspective view of the tri-web in an inverted T configuration as in FIG. 4, where the stitch lines are shown. On base 10 repeating truncated triangle sections 13 are formed from the truncated triangle stitch line 24, with the repeating truncated triangles sections 13 separated by tabs 12. In riser 9, flat bottom U stitch line 23 is present, where repeating flat-bottomed U shape sections 15 are formed, separated by tabs 14. The flat bottom of the flat bottom U stitch line 23 is closer to the top of riser 9 than over edge stitch line 22. Referring now to FIG. 8, shown is a perspective view of the rotated tri-web configuration identical to FIG. 6, where cut lines are shown which detail how individual bags are produced from the web. Transverse cut line 17 bisects tabs 14 and 12 (not shown). Straight over edge cut line 18, positioned above over edge stitch line 22 and below the flat bottom U 23 stitch line proximate the top edge is made to allow the top of the separated bag to open. Referring now to FIG. 9, it shows the cut web from FIG. 8, forming a single bag. Truncated stitch line 24 and one of the repeating truncated triangle sections 13 is shown in the base of the tri-web, with flat bottom U stitch line 23 and one of the repeating flat-bottomed U shaped section 15 in the riser Referring now to FIG. 10, it shows a completed bag having top edge 19 and over edge stitch 22 oriented in a preferred position inside a shipping carton 20. Referring now to FIG. 11, it shows a completed bag having top edge 19 and over edge stitch 22 inside a shipping carton 20 being folded into a preferred closure method for the top. Referring now to FIG. 12A, it shows a bag a bag having top edge 19 and over edge stitch 22 with a preferred sinusoidal closure method 21 for the top. Referring now to FIG. 12B, it shows of the sinusoidal 21 or hourglass shape of the top edge of the bag when folded into a preferred closure method. Referring now to FIG. 13, it shows a completed preferred closure method of bag having first side web 3, second side web 4 with over edge stitch 22, using the sinusoidal shape 21. Referring now to FIG. 14, it shows a side view of a bag with over edge stitch 22 using the preferred closure method, placed in carton 20. Referring now to FIG. 15, it shows the end view of a finished bag having first side web 3, second side web 4 and bottom web 5, top edge 19 and over edge stitch 22. Referring now to FIG. 16, it shows the side view of the finished bag. Referring now to FIG. 17, shown is a cylindrical bag. To construct this type of bag, a flat sheet of insulating material is folded to form a cylinder shape 29, applying a connection 26 to form cylinder with a round bottom 29, an edge stitch 25, and then adding a separately cut round piece of material 28 and using a connecting stitch 27 to connect the round piece 28 to the cylinder 29.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be affected without departing from the spirit and scope of the invention as described and claimed.

I claim:

1. A process for producing bags comprising:
feeding a bottom web, a first side web and a second side web in a conversion process, each of the webs having a first side edge and a second side edge, wherein the first side edge of the first side web is aligned with the first side edge of the second side web, the second side edge of the first side web is aligned with the first side edge of the bottom web, and the second side edge of the second side web is aligned with the second side edge of the bottom web, thereby forming an inverted T-shaped web comprising a base having first and second wing portions and a riser, wherein the first wing portion comprises the bottom web and first side web, the second wing portion comprises the bottom web and the second side web, and the riser comprises the first and second side webs;

sewing the first side web to the bottom layer in the first wing portion with a repeating pattern comprising a truncated triangle having a narrow portion and wider portion, and a tab separating the triangles, wherein the narrow portion of the triangle points toward the second side edge of the first side web;

sewing the second side web to the bottom layer in the second wing portion with a repeating pattern comprising a truncated triangle having a narrow portion and wider portion, and a tab separating the triangles, wherein the narrow portion of the triangle points toward the second side edge of the second side web;

contacting the first and second wing portions by folding them toward each other, thereby forming a folded web;

rotating the folded web to the horizontal;

sewing the first and second webs together in the riser with a repeating pattern comprising a flat-bottomed U shape with tabs separating the repeating U's, where the flat bottom of the U faces the first side edge of the first and second side webs, and the tabs separating the flat-bottomed U's are bisecting the tab separating the truncated triangles in the first and second wing portions, thereby forming a web of sewn bags;

cutting the web of sewn bags along the edge to remove the sewn portion corresponding to the flat bottom portion of the flat bottom U shape parallel to the edge, thereby forming a web of open top bags; and transversely cutting the web of open top bags at the middle of the truncated triangles and bisecting the repeating U's, thereby forming separate, open bags, and optionally scrap material.

2. The process of claim 1 where the bottom web, first side web and second side web are independently selected from multi-layer paper tissue material, recycled textile containing material, bonded cellulose fiber material, other insulation material and cellulosic material.

3. The process of claim 2 where the bottom web, first side web and second side web are cellulosic material.

4. A bag produced by the process of claim 1.

5. The bag of claim 4 wherein the bag further comprises a handle.

6. The process of claim 1 further comprising removing the scrap material.

7. The process of claim 6 wherein the scrap is removed by a cutting device.

8. The process of claim 6 wherein the scrap is removed by a pre-applied perforation.

* * * * *